United States Patent
Kuebler et al.

(10) Patent No.: US 7,070,013 B1
(45) Date of Patent: Jul. 4, 2006

(54) DECENTRALIZED POWER SUPPLY SYSTEM FOR A VEHICLE

(75) Inventors: Eberhard Kuebler, Renningen (DE); Arnold Lamm, Elchingen (DE); Jens Mueller, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 580 days.

(21) Appl. No.: 09/487,594

(22) Filed: Jan. 19, 2000

(30) Foreign Application Priority Data

Jan. 20, 1999 (DE) ................................. 199 02 051

(51) Int. Cl.
*B60K 1/00* (2006.01)
(52) U.S. Cl. ..................................... 180/65.1; 180/54.1
(58) Field of Classification Search ............... 180/54.1, 180/58, 60, 65.1, 68.5, 311, 173, 69.5; 318/280, 318/282, 283, 286, 460
See application file for complete search history.

(56) References Cited

U.S. PATENT DOCUMENTS

| | | | | |
|---|---|---|---|---|
| 3,593,816 A | * | 7/1971 | Kazaoka | 180/281 |
| 3,662,975 A | * | 5/1972 | Driskill | 244/58 |
| 3,662,978 A | * | 5/1972 | Hollrock | 244/122 A |
| 3,727,348 A | * | 4/1973 | Steinmann et al. | 49/28 |
| 3,844,130 A | * | 10/1974 | Wahnish | 62/133 |
| 4,192,216 A | * | 3/1980 | Wait | 89/40.03 |
| 4,422,521 A | * | 12/1983 | Mochida | 180/271 |
| 4,427,929 A | * | 1/1984 | Andrei-Alexandru et al. | 318/282 |
| 4,448,157 A | * | 5/1984 | Eckstein et al. | 123/142.5 R |
| 4,489,242 A | * | 12/1984 | Worst | 307/10.1 |
| 4,645,159 A | * | 2/1987 | Terada et al. | 248/429 |
| 4,785,907 A | * | 11/1988 | Aoki et al. | 180/274 |
| 4,878,359 A | * | 11/1989 | Mandell | 62/239 |
| 5,072,163 A | * | 12/1991 | Koura et al. | 318/286 |
| 5,193,635 A | * | 3/1993 | Mizuno et al. | 180/65.3 |
| 5,212,431 A | * | 5/1993 | Origuchi et al. | 318/139 |
| 5,381,065 A | * | 1/1995 | Jones | 318/454 |
| 5,525,891 A | * | 6/1996 | Meyer et al. | 320/15 |
| 5,540,831 A | * | 7/1996 | Klein | 205/630 |
| 5,547,208 A | * | 8/1996 | Chappell et al. | 180/281 |
| 5,635,805 A | * | 6/1997 | Ibaraki et al. | 318/139 |
| 5,896,750 A | * | 4/1999 | Karl | 62/236 |
| 5,932,931 A | * | 8/1999 | Tanaka et al. | 307/10.1 |
| 5,945,796 A | * | 8/1999 | Ohmori et al. | 318/266 |
| 5,986,416 A | * | 11/1999 | Dubois | 318/139 |
| 5,998,960 A | * | 12/1999 | Yamada et al. | 320/104 |
| 6,044,922 A | * | 4/2000 | Field | 180/65.2 |
| 6,056,076 A | * | 5/2000 | Bartel et al. | 180/167 |
| 6,064,165 A | * | 5/2000 | Boisvert et al. | 318/465 |
| 6,100,658 A | * | 8/2000 | Kume et al. | 318/286 |
| 6,207,310 B1 | * | 3/2001 | Wilson et al. | 429/26 |

(Continued)

FOREIGN PATENT DOCUMENTS

DE 197 03 171 A1 8/1998

*Primary Examiner*—Christopher P. Ellis
*Assistant Examiner*—Bridget Avery
(74) *Attorney, Agent, or Firm*—Crowell & Moring LLP

(57) ABSTRACT

A motor vehicle has a plurality of electric consuming devices and a power supply system for supplying the electric consuming devices with electric energy. The power supply system has a decentralized construction and, for supplying electric energy to at least one electric consuming device or to a group of electric consuming devices, has a fuel cell system which is electrically isolated from other power sources and which is arranged in the proximity to the assigned consuming device or group of consuming devices. The decentralized construction may have many mutually independent fuel cell systems, permitting a high-efficiency power supply.

14 Claims, 1 Drawing Sheet

U.S. PATENT DOCUMENTS

| | | | |
|---|---|---|---|
| 6,211,643 B1 * | 4/2001 | Kagatani | 320/101 |
| 6,326,097 B1 * | 12/2001 | Hockaday | 429/34 |
| 6,349,537 B1 | 2/2002 | Newton | |
| 6,408,966 B1 * | 6/2002 | Benz et al. | 180/65.1 |
| 2002/0040818 A1 * | 4/2002 | Maruyama | 180/65.2 |
| 2002/0056993 A1 * | 5/2002 | Kennedy | 290/1 A |

* cited by examiner

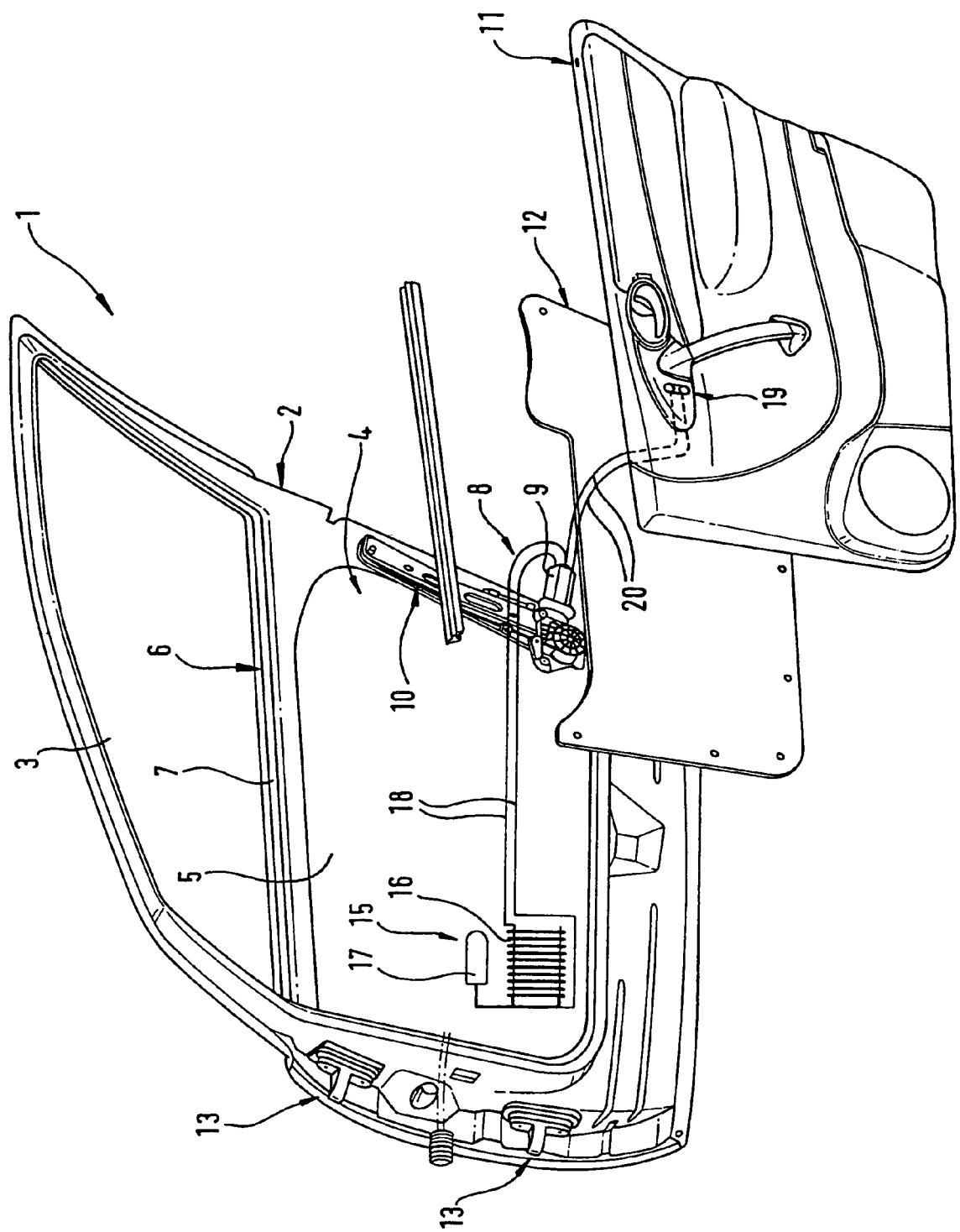

DECENTRALIZED POWER SUPPLY SYSTEM FOR A VEHICLE

BACKGROUND AND SUMMARY OF THE INVENTION

This application claims the priority of German patent document 199 02 051.5, filed Jan. 20, 1999, the disclosure of which is expressly incorporated by reference herein.

The present invention relates to a power supply system for a vehicle having at least one fuel cell system which is electrically independent of other power sources that form the power supply system of the vehicle, for supplying electricity to at least one assigned electric load component.

In conventional motor vehicles, a generator (sometimes called a dynamo) provided for generating electric energy, is driven by the internal-combustion engine of the vehicle drive. The current supplied by the generator is made available to the electric consuming devices in the vehicle by way of a central electrical wiring system having a plurality of cables. The generator is also used for charging the vehicle battery which, during an engine stoppage, engine start and low rotational engine speeds, buffers the power supply required for the electrical wiring system. The overall efficiency of a power supply system having a generator is very low because thermal energy must first be converted to mechanical and subsequently to electric energy.

In many modern vehicles, because of the large number of electric consuming devices distributed in the entire vehicle, the electric power demand has risen to such an extent that the generation of such power contributes significantly to the overall consumption of primary energy or fuel. To improve the efficiency, it has been suggested in German Patent Document DE 195 23 109 A1 to use a fuel cell system as the central power supply to the electric consuming devices provided by way of the electric wiring system. Because the efficiency of a fuel cell is better than that of a generator, the required current can be provided with a significantly reduced fuel consumption. A similar suggestion is known from German Patent Document DE 197 03 171 A1. Also in that document, the power supply of the electric consuming devices connected to the electrical wiring system by means of a central fuel cell assembly is suggested which has two fuel cell stacks which are connected in parallel or in series.. One separate group of wiring system consuming devices respectively can be supplied, by means of each of the stacks. Another suggestion aims at providing, in addition to the normal 12 volt wiring system, a second wiring system with a higher voltage (for example, 42 volts), so that power losses to the connected consuming devices are reduced due to the current levels, which are reduced in comparison to the 12 volt system.

It is an object of the invention to provide an improved power supply for a vehicle, particularly of a motor vehicle, with respect to the achievable efficiency. Another object of the invention is to provide such a power supply system which is particularly easily mountable.

These and other objects and advantages are achieved by the power supply system according to the invention, which has a decentralized construction and, for the electric supply of at least one of the electric consuming devices, has at least one dedicated fuel cell system which is electrically independent of other power generating devices of the power supply system. The decentralized construction provides a large number of advantages due to an expedient arrangement in which the power generator and consuming devices are situated as close to one another as possible.

As a result of the invention, the wiring in vehicles, which becomes more and more complicated and requires higher expenditures as driving comfort rises, can be simplified considerably because, as a rule, only short distances exist between a power source and a consuming device or a consuming device. Because of the resulting reduction of the number of cables and a significant shortening of the average cable lengths, weight can be saved, which positively affects the energy consumption of the vehicle. Vehicle parts, such as doors, seats or the like, can be completely assembled with the electric consuming devices assigned to them (such as window lift mechanisms or the like), and the pertaining fuel cell system as the power supply system, and can then be installed in a few steps on the pertaining vehicle. The labor expenditures for the assembly are therefore reduced because measures for the electric connection of the consuming devices are not required.

In addition, frequent sources of defects, such as loose contacts on plug-type connectors, short-circuits, cable burns or cable breaks, "chewing by martens", or the like, are reduced or avoided because cables and cable connections are required only to a minor extent and, in addition, are largely situated at protected points. Some or all power generators can be situated outside the engine compartment in a protected manner. Because the average electric line lengths are short, a high-expenditure development of a second wiring system is not required.

According to the invention, power supply to many or all consuming devices takes place by means of fuel cells. These permit direct conversion of a supplied fuel to electric energy in compact and almost arbitrarily scalable units at a high efficiency. It is known that for this purpose electric current and water vapor are generated from fuel and atmospheric oxygen in a fuel cell system which normally consists of several mutually connected individual fuel cell elements which are arranged in a stack-type manner. The required fuel is fed either directly from the tank or storage device or is produced in a front-connected reforming process according to the demand from hydrocarbon-containing energy carriers, such as methanol, and water.

Each fuel cell system can be operated independently of the driving engine and is therefore available at any time for electric supply to its assigned consuming devices, even when the drive is switched off. The energy supply to all power consuming devices supplied by the fuel cell systems, in addition, does not impair the operation (and particularly the start) of the driving engine. As a result, an optionally existing generator can be optimally adapted to the pertaining drive.

It is also possible to construct the vehicle completely without a drive-dependent power generating system. The supply of individual consuming devices and groups of consuming devices by a single exclusively assigned decentralized fuel cell system also permits adaptation of its power emission (by means of the design, size and number of cells) optimally to the power requirement of the assigned consuming devices, whereby the efficiency can be improved.

Because of the high efficiency of generating power by means of fuel cells, the overall consumption of primary energy of the vehicle as a whole can be lowered. Also, the power supply of the electric consuming devices can be partially, predominantly, or (preferably) even completely, uncoupled from the drive.

The decentralization of the power supply according to the invention permits the arrangement of a fuel cell system close to the assigned consuming device or to the assigned group of consuming devices. To avoid unnecessary cable lengths and to reduce line losses, the arrangement may be such that no consuming device connected to a fuel cell system is more than one meter (or more than 50 cm) away from the assigned fuel cell system. Depending on the number of its electric consuming devices, a vehicle may correspondingly have several, particularly more than two or five or ten spatially mutually separate, electrically non-connected fuel cell systems which in particular may have different output voltages and/or a different output power.

To improve efficiency, the electric power of a particular fuel cell system can be individually adapted to the power demand of the assigned consuming devices in a simple manner. Depending on the degree of the decentralization, fewer than five (or even fewer than three) electric consuming devices can be assigned to a fuel cell system. Optionally, only a single electric consuming device may be assigned to a fuel cell system, which results in a particularly good adaptation and a correspondingly high efficiency. Such decentralization may optionally be carried out to such an extent that the vehicle no longer has a central electric wiring system. In this case, an electric wiring system is a system of electric supply lines which converge at one or several points, so that they are all connected with one another or can be connected with one another. However, a power supply system according to the invention may have several local wiring systems, for example, for supplying several electric consuming devices on or in a preassembled component by means of an individual fuel cell system assigned to the component.

According to the invention, a fuel cell system is arranged on or in a component of the vehicle which can be preassembled as a subassembly and which has all consuming devices assigned to the fuel cell system. The vehicle may, for example, have at least one vehicle door, on or in which at least one fuel cell system is arranged for electrically supplying electric consuming devices of the vehicle door (for example, an electric window lift mechanism, an electric outside mirror adjustment system or an outside mirror heater). In a corresponding manner, for example, for supplying power to an electric seat heater and/or an electrically operated seat position adjusting system, a vehicle seat may have one or several assigned fuel cell systems. A secondary unit, such as an air-conditioning compressor, which is provided with an electric drive, can also be equipped with a separately assigned fuel cell system. As another example, the equipping of a vehicle body module with one or several especially assigned fuel cell systems is conceivable, for example, a rear module which can be preassembled as a subassembly and which has a fuel cell system for electrically supplying the tail lights and an optionally installed CD player or the like. Additional examples of electric consuming devices which can be supplied in a decentralized manner are an electric drive for a sliding roof, an engine compartment lid or a trunk lid with a lighting system, etc.

The decentralized power supply also makes it possible that no electric supply lines extend between a particular component, which has at least one electric consuming device, and another component of the vehicle (for example, the vehicle chassis) which is detachably and/or movably connected with the particular component. As a result, cable feed-throughs, cable sections stressed by bending, plug-type contacts or other stressed areas or areas which are susceptible to disturbances can be avoided, for example, between a vehicle body and a vehicle door. The triggering of the electric consuming devices can take place, for example, by component-internal switches by way of corresponding signal cables or without cables.

The construction of a fuel cell system can be adapted to the power demand of the connected consuming devices and/or the space conditions at the decentralized installation site. Although it is possible to connect several fuel cells to a common hydrogen supply, it is preferable for the systems to be self-sufficient, so that a fuel cell system comprises at least one fuel cell or a group of fuel cells (stack) and an assigned hydrogen supply device for the fuel cell. The hydrogen supply device may have at least one hydrogen tank or storage device which is preferably mounted in an easily exchangeable manner at the assigned component. Particularly, a hydrogen cartridge can be used for this purpose. Such limited hydrogen supplies are suitable particularly for fuel cell systems of such consuming devices whose power demand is low and/or which are operated only now and then or for short time periods, such as electric window lift mechanisms. It is also possible that a hydrogen supply device has at least one fuel tank for receiving hydrocarbon-containing liquid fuel, particularly methanol, as well as an assigned reforming device for the conversion of the fuel into hydrogen. This fuel tank may also be constructed to be exchangeable and/or to be chargeable from outside the component. Several reforming devices may also be supplied from a common fuel tank. In addition, it is conceivable to directly operate the fuel cells by means of liquid fuels, for example, in a direct-methanol fuel cell.

A person skilled in the art can recognize that a decentralized power supply in vehicles by means of fuel cells permits a large number of constructive variants, which can each be selected with a view to optimizing the efficiency and/or optimizing the easy mounting and/or optimally taking into account the space situations existing at the installation site in the proximity of electric consuming devices.

Additional characteristics and details of the invention are found in the following description of a preferred embodiment in conjunction with the drawing and the subclaims. In this case, the individual characteristics can each be implemented separately or several characteristics may be implemented in combination with one another in the case of one embodiment.

BRIEF DESCRIPTION OF THE DRAWINGS

The single FIGURE is a perspective exploded view of a passenger car door with an electric window lift mechanism and a fuel cell system for electrically supplying the window lift mechanism.

DETAILED DESCRIPTION OF THE DRAWINGS

The perspective exploded representation of the single FIGURE shows several prefabricated components of a front passenger door 1 of a passenger car (not shown). The door has a self-supporting steel plate frame part 2 with an upper frame opening 3, which can be closed by a window (not shown), and an approximately square lower frame opening 4 situated underneath whose exterior side is covered by a steel plate door skin 5.

Between the frame openings 3, 4, a cross strut 6 is situated which has a longitudinal slot 7 through which a window pane can be guided in a sealed-off manner whose shape is adapted to the shape of the upper frame opening 3 (not shown). For lifting and lowering the window, an electric window lift mechanism 8 is provided which has an electric drive fastened to the rearward vertical strut of the frame, which drive 9 is applied by way of a bowden cable device 10 to a window carrier (not shown). During the final assembly of the door, the lower frame opening 4 is closed off toward the inside by the screwing-on of the interior paneling 11 with the insertion of a water-tight covering 12. Between the covering 12 and the outer skin 5, a door interior is formed which is laterally bounded by the frame struts and which provides space for the accommodation of the lowered window. On the forward vertical frame part, two hinge elements 13 disposed above one another are welded on, which, when the completely assembled door is mounted, are connected with complementary hinge elements of the vehicle body.

For supplying the electric window lift mechanism 8 with electric current, a fuel cell system 15 is provided which comprises a fuel cell stack 16 and a hydrogen storage device in the form of an exchangeable cartridge 17 connected to the fuel cell stack 16. The fuel cell system 15 which is mounted approximately 80 to 100 cm away from the window lift mechanism is connected by way of a pair of electric supply lines 18 with the drive 9 of the window lift mechanism. The window lift mechanism is controlled by way of a switch 19 which is mounted on the interior paneling 11 and which is connected by way of control lines 20 with the electric drive 9.

In the embodiment, shown as an example, the individual cells of the stack or stacks of the fuel cell assembly 16 are constructed as air-breathing hydrogen air fuel cells with a proton conducting membrane. The total output of the fuel cell stack 16 is adapted to the power demand (approximately 20 watts) of the electric drive 9 of the window lift mechanism 8. The quantity of the primary energy carrier present in the hydrogen cartridge 17 is dimensioned such that it is sufficient for the sporadic and usually only short-term operation of the window lift mechanism for periods of time which are sufficiently long that the hydrogen cartridge 17 need be exchanged only within the scope of the normal service interval of the vehicle. After removal of the interior paneling 11 with the covering 12, this can take place by means of a few manipulations.

The vehicle door 1 represents an example of a component which is completely self-sufficient electrically with respect to the remaining vehicle and has an electric consuming device (window lift mechanism). Since the electric supply lines 18 as well as the control lines 20 used for triggering the drive 9 are integrated in the door, the door can be completely and in an electrically operative manner finally assembled at the supplier or at a different location and can be installed on the vehicle body by means of a few steps. During the installation, no measures are required for electric connection of the door to a vehicle-internal power supply system. This reduces considerably the labor expenditures for the assembly. In addition, frequent causes of defects, such a loose contacts on plug-type connections or cable breaks in the swivel area between the door and the vehicle body are avoided. Moreover, the electric supply lines and the control lines 20 extend in a protected manner in the interior of the door where they are protected from dirt, damage and, for example, chewing by martens.

In the driver's door, which is to be mounted on the other side of the vehicle body, and possibly in the rear doors, the vehicle may have additional fuel cell systems of this type for supplying the electric consuming devices operating there. Other electric consuming devices of the vehicle may also have separate fuel cell systems for their power supply. The illustrated system, in which hydrogen from the storage device 17 is provided directly to the fuel cell assembly 16, is particularly suitable for small electric consuming devices, such a window lift mechanisms, mirror adjusting systems, sliding roof adjusting systems or the like. For the decentralized power supply of larger consuming devices, such as an air-conditioning compressor, an operation can take place by means of fuel cells and the reforming of hydrocarbons.

A decentralized power supply by means of fuel cells is advantageous not only in the case of the passenger cars explained as examples, but also in the case of other land vehicles, such as trucks or the like. Watercraft or aircraft may also be equipped in the manner according to the invention with a power supply system which is distinguished particularly by the high efficiency and the easy assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A decentralized power supply system for a vehicle, comprising at least one fuel cell system and other power generators, wherein:
    in normal operation of the power supply system, the at least one fuel cell system is electrically isolated from the other power generators of the power supply system, is dedicated to supplying electricity to an assigned electric consuming device that is incorporated in a structural subassembly of the vehicle, and is an exclusive source of electric power supply to said assigned electric consuming device; and
    the at least one fuel cell system is collocated with the assigned electric consuming device, and is mounted on or in said structural subassembly of the vehicle.

2. Power supply system according to claim 1, wherein said structural component comprises at least one vehicle door on which or in which at least one fuel cell system is arranged for supplying electricity to an electric consuming device of the vehicle door, the consuming device being at least one of a window lift mechanism, an outside mirror heater and an electric mirror adjusting system.

3. Power supply system according to claim 1, comprising at least one secondary unit provided with an electric drive, on which or in which secondary unit at least one fuel cell system is arranged for supplying electricity to the drive, the secondary unit being an air-conditioning compressor.

4. Power supply system according to claim 1, comprising at least one vehicle body module on which or in which at least one fuel cell system is arranged for supplying electricity to electric consuming devices of the vehicle body module.

5. Power supply system according to claim 1, wherein the fuel cell system comprises at least one fuel cell and an assigned fuel supply system for the at least one fuel cell.

6. Power supply system according to claim 2, wherein said structural component comprises a vehicle seat which can be movably fastened on the vehicle and on which or in which the fuel cell system is arranged for supplying electricity to electric consuming devices of the vehicle seat selected from the group consisting of an electric seat heater and an electric seat position adjusting system.

7. Power supply system according to claim 5, wherein the fuel supply system has at least one exchangeable fuel storage device.

8. Power supply system according to claim 7, wherein said fuel storage device comprises a hydrogen cartridge.

9. Power supply system according to claim 7, wherein the fuel supply system has at least one fuel tank for accommodating a hydrocarbon-containing liquid fuel.

10. A vehicle having a power supply system according to claim 8, wherein the fuel storage device is exchangeable or fillable outside the vehicle or the component.

11. Power supply system according to claim 9, wherein the fuel supply system further comprises a reforming device for conversion of fuel to hydrogen.

12. A power supply system for an electric consuming device in a motor vehicle, comprising:
- a dedicated fuel cell system which, in normal operation of said power supply system, is connected as an exclusive supply of electric power to said consuming device; wherein
- in normal operation of said power supply system, said fuel cell system is electrically isolated from other power generators in said vehicle; and
- said fuel cell system is collocated with said electric consuming device, in a structural component of the vehicle.

13. Motor vehicle apparatus comprising:
- a component part which is mountable to a motor vehicle body;
- an electrically actuated device which is mounted on or in said component part; and
- a fuel cell system which is isolated and self contained and is mounted on or in said component part, collocated with said electrically actuated device, and is a dedicated and exclusive source of electric power supply to operate said electrically actuated device;
- wherein the component part is one of a vehicle door and a vehicle seat.

14. A power supply system for a vehicle having a plurality of power consumers disposed in subassemblies of said vehicle, said power supply system comprising:
- a plurality of individual power sources which, in normal operation of said power supply system, are electrically isolated and spatially separated from each other; wherein
- each of said individual power sources is connected as an exclusive source of electric power supply to a respective group of consumers, which are associated therewith; and
- each group of consumers is separately located in a different respective vehicle subassembly and is electrically isolated from other groups of consumers;
- each of said individual power sources is collocated with the group of consumers with which it is associated, within the same vehicle subassembly which contains said group of consumers with which it is associated; and
- said power sources comprise fuel cell units.

* * * * *